United States Patent
Ray et al.

(10) Patent No.: US 10,872,041 B2
(45) Date of Patent: Dec. 22, 2020

(54) METHOD AND APPARATUS FOR JOURNAL AWARE CACHE MANAGEMENT

(71) Applicant: Intel Corporation, Santa Clara, CA (US)

(72) Inventors: Madhurima Ray, Philadelphia, PA (US); Sanjeev N. Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 16/211,157

(22) Filed: Dec. 5, 2018

(65) Prior Publication Data

US 2019/0108137 A1     Apr. 11, 2019

(51) Int. Cl.
| | | |
|---|---|---|
| *G06F 12/08* | (2016.01) | |
| *G06F 12/121* | (2016.01) | |
| *G06F 12/0804* | (2016.01) | |
| *G06F 12/0868* | (2016.01) | |
| *G06F 12/0895* | (2016.01) | |

(52) U.S. Cl.
CPC ........ *G06F 12/121* (2013.01); *G06F 12/0804* (2013.01); *G06F 12/0868* (2013.01); *G06F 12/0895* (2013.01); *G06F 2212/1044* (2013.01)

(58) Field of Classification Search
CPC ............... G06F 12/121; G06F 12/0895; G06F 12/0868; G06F 12/0804
USPC ....................................................... 711/133
See application file for complete search history.

(56) References Cited

U.S. PATENT DOCUMENTS

| | | | |
|---|---|---|---|
| 9,390,116 B1 * | 7/2016 | Li | G06F 16/2272 |
| 9,933,961 B1 * | 4/2018 | Visvanathan | G06F 3/0641 |
| 10,275,351 B2 * | 4/2019 | Long | G06F 3/0659 |
| 2007/0233947 A1 | 10/2007 | Coulson et al. | |
| 2015/0016172 A1 * | 1/2015 | Loh | G11C 5/02 365/51 |
| 2015/0193464 A1 * | 7/2015 | Kwon | G06F 16/1815 707/648 |
| 2016/0224588 A1 * | 8/2016 | Harijono | G06F 3/0641 |
| 2017/0185523 A1 | 6/2017 | Trika et al. | |
| 2018/0260324 A1 * | 9/2018 | Marathe | G06F 12/0804 |

OTHER PUBLICATIONS

Mohan, et al., "ARIES/IM: An Efficient and High Concurrency Index Management Method Using Write-Ahead Logging", In Proceedings of the ACM SIGMOD International Conference on Management of Data, vol. 21, Issue 2, Jun. 2, 1992, pp. 371-380.*

Mohan, et al., "ARIES: A Transaction Recovery Method Supporting Fine-Granularity Locking and Partial Rollbacks Using Write-Ahead Logging", In Journal ACM Transactions on Database Systems, vol. 17, Issue 1, Mar. 1992, pp. 94-162.*

(Continued)

*Primary Examiner* — Pierre Miche Bataille
(74) *Attorney, Agent, or Firm* — Compass IP Law, PC

(57) ABSTRACT

An intelligent journal-aware caching manager for journaled data is provided. The caching manager ensures that data is not duplicated in a write-ahead-log ("journal") and volatile cache memory ("cache"). The caching manager maintains first-in-first-out ("FIFO") policy for the journal as needed and includes an alternate caching policy for non-journaled data.

14 Claims, 7 Drawing Sheets

(56) References Cited

OTHER PUBLICATIONS

J. Li et al., "Review on HDD-Based, SSD-Based and Hybrid Key-Value Stores," 2017 IEEE 15th Intl Conf on Dependable, Autonomic and Secure Computing, 3rd Intl Conf on Big Data Intelligence and Computing and Cyber Science and Technology Congress(DASC/PiCom/DataCom/CyberSciTech), Orlando, FL, 2017, pp. 1236-1241.*
X. Zhang, D. Feng, Y. Hua and J. Chen, "Optimizing File Systems with a Write-Efficient Journaling Scheme on Non-Volatile Memory," in IEEE Transactions on Computers, vol. 68, No. 3, pp. 402-413, Mar. 1, 2019, doi: 10.1109/TC.2018.2870380.*

\* cited by examiner

METHOD AND APPARATUS FOR JOURNAL AWARE CACHE MANAGEMENT

FIELD

This disclosure relates to computer systems and in particular to journal aware cache management.

BACKGROUND

A non-relational (also referred to as NoSQL) database can use a data structure such as a key-value pair to store data. A key-value pair includes a key (an attribute name) and a value. The data represented as a key-value pair can be stored in a non-volatile storage device such as a Solid-State Drive (SSD) or a Hard Disk Drive (HDD) in a computer system.

Data represented as a key-value pair can be stored in a write-ahead-log that is data power-fail safe in the computer system prior to being written to the non-volatile storage device. Read performance can be improved by storing data represented by a key-value pair that is read from the non-volatile storage device in a volatile cache memory in the system.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined as set forth in the accompanying claims.

DESCRIPTION OF EMBODIMENTS

If data represented by a key-value pair stored m the volatile cache memory is modified, the modified key-value pair is written to the volatile cache memory. The data represented by the key-value pair is also written to the write-ahead-log so that it can be written to the non-volatile storage device. Similarly, if data that is in the write-ahead-log to be written to the non-volatile storage device is read, it is written to the volatile cache memory. The duplication of data in both the write-ahead-log and the volatile cache memory is inefficient and reduces the hit-rate of the volatile cache memory.

The write-ahead-log can also be referred to as a "journal" and is typically implemented as a circular buffer that stores data to be written to the non-volatile storage device. In an embodiment, an intelligent journal-aware caching manager for journaled data ensures that data is not duplicated in the write-ahead-log ("journal") and the volatile cache memory ("cache"), maintains first-in-first-out ("FIFO") policy for the journal as needed, and includes an alternate caching policy for non-journaled data.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
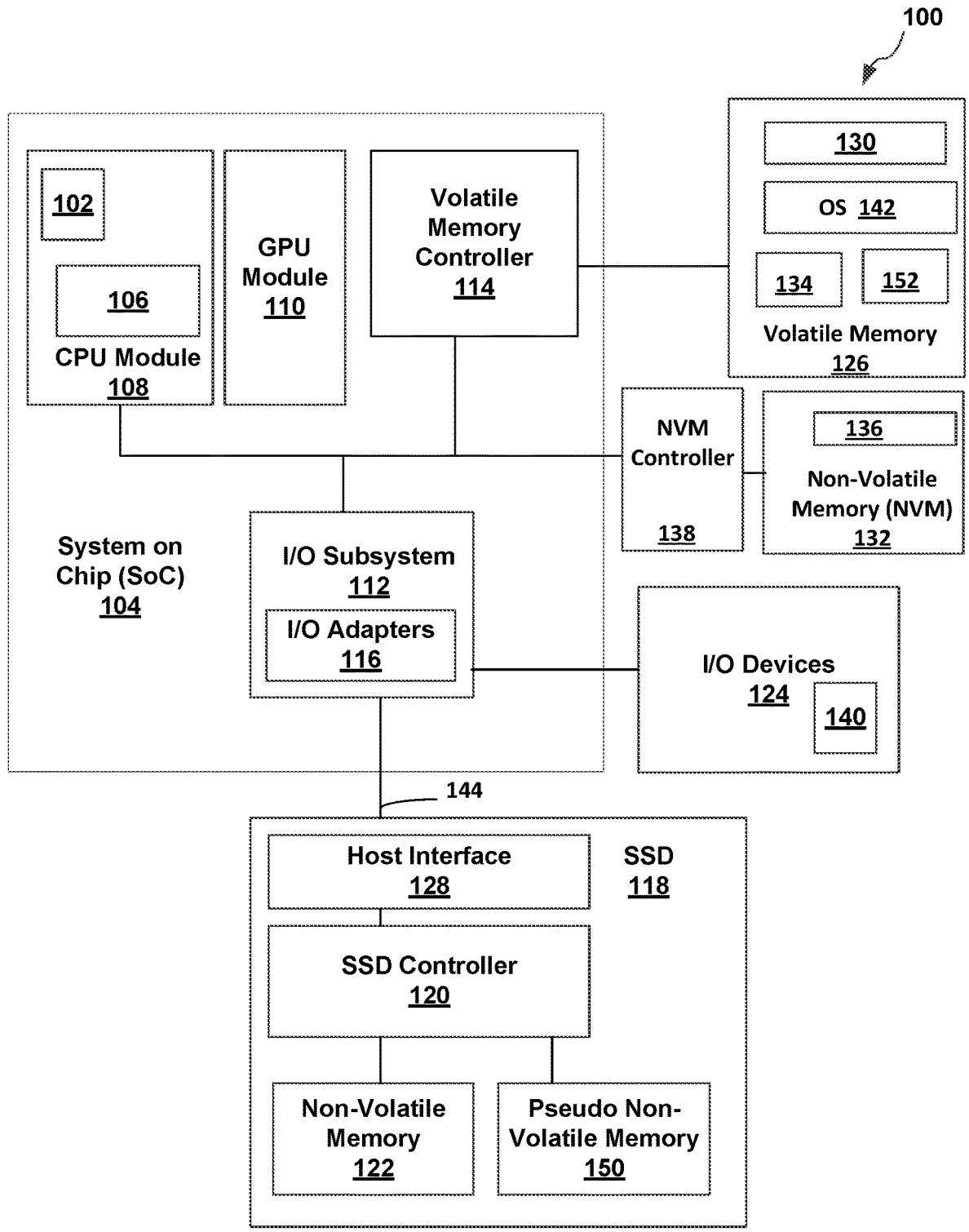
FIG. 1 is a block diagram of a computer system that includes an intelligent journaling-aware caching policy manager for journaled data.

FIG. 1 is a block diagram of a computer system 100 that includes an intelligent journaling-aware caching policy manager for journaled data. Computer system 100 can correspond to a computing device including, but not limited to, a server, a workstation computer, a desktop computer, a laptop computer, and/or a tablet computer.

The computer system 100 includes a system on chip (SOC or SoC) 104 which combines processor, graphics, memory, and Input/Output (I/O) control logic into one SoC package. The SoC 104 includes at least one Central Processing Unit (CPU) module 108, a volatile memory controller 114, and a Graphics Processor Unit (GPU) 110. In other embodiments, the volatile memory controller 114 can be external to the SoC 104. Although not shown, each of the processor core(s) 102 can internally include one or more instruction/data caches, execution units, prefetch buffers, instruction queues, branch address calculation units, instruction decoders, floating point units, retirement units, etc. The CPU module 108 can correspond to a single core or a multi-core general purpose processor, such as those provided by Intel® Corporation, according to one embodiment.

The Graphics Processor Unit (GPU) 110 can include one or more GPU cores and a GPU cache which can store graphics related data for the GPU core. The GPU core can internally include one or more execution units and one or more instruction and data caches. Additionally, the Graphics Processor Unit (GPU) 110 can contain other graphics logic units that are not shown in FIG. 1, such as one or more vertex processing units, rasterization units, media processing units, and codecs.

Within the I/O subsystem 112, one or more I/O adapter(s) 116 are present to translate a host communication protocol utilized within the processor core(s) 102 to a protocol compatible with particular I/O devices. Some of the protocols that adapters can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 116 can communicate with external I/O devices 124 which can include, for example, user interface device(s) including a display and/or a touch-screen display 140, printer, keypad, keyboard, communication logic, wired and/or wireless, storage device(s) including hard disk drives ("HDD"), solid-state drives ("SSD") 118, removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (Non-Volatile Memory Express) over PCIe (Peripheral Component Interconnect Express), and SATA (Serial ATA (Advanced Technology Attachment)).

Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

The I/O adapter(s) 116 can also communicate with a storage device, that can be a hard disk drive (HDD) or a solid-state drive ("SSD") 118 which includes a SSD controller 120, a host interface 128 and non-volatile memory 122 that includes one or more non-volatile memory devices. The solid state drive 118 can also include a pseudo non-volatile memory buffer 150 that can be a volatile memory that retains data for a period of time after a loss of power through the use of a supercapacitor.

The system can include a non-volatile memory 132 and a non-volatile memory controller 138 communicatively coupled to the CPU module 108 in the SoC 104. A write-ahead-log 136 can be stored in the non-volatile memory 132. The non-volatile memory 132 can be included in a dual in-line memory module (DIMM) that can be referred to as a non-volatile dual in-line memory module (NVDIMM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also include a byte-addressable write-in-place three dimensional crosspoint memory device, or other byte addressable write-in-place memory (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

The I/O adapters 116 can include a Peripheral Component Interconnect Express (PCIe) adapter that is communicatively coupled using the NVMe (NVM Express) over PCIe (Peripheral Component Interconnect Express) protocol over bus 144 to a host interface 128 in the solid state drive 118. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus). The NVM Express standards are available at www.nvmexpress.org. The PCIe standards are available at www.pcisig.com.

Applications 130, an operating system (OS) 142, a cache manager 134 and a non-relational database manager 152 can be stored in volatile memory 126. Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

An operating system 142 is software that manages computer hardware and software including memory allocation and access to I/O devices. Examples of operating systems include Microsoft® Windows®, Linux®, iOS® and Android®.

Figure 2:
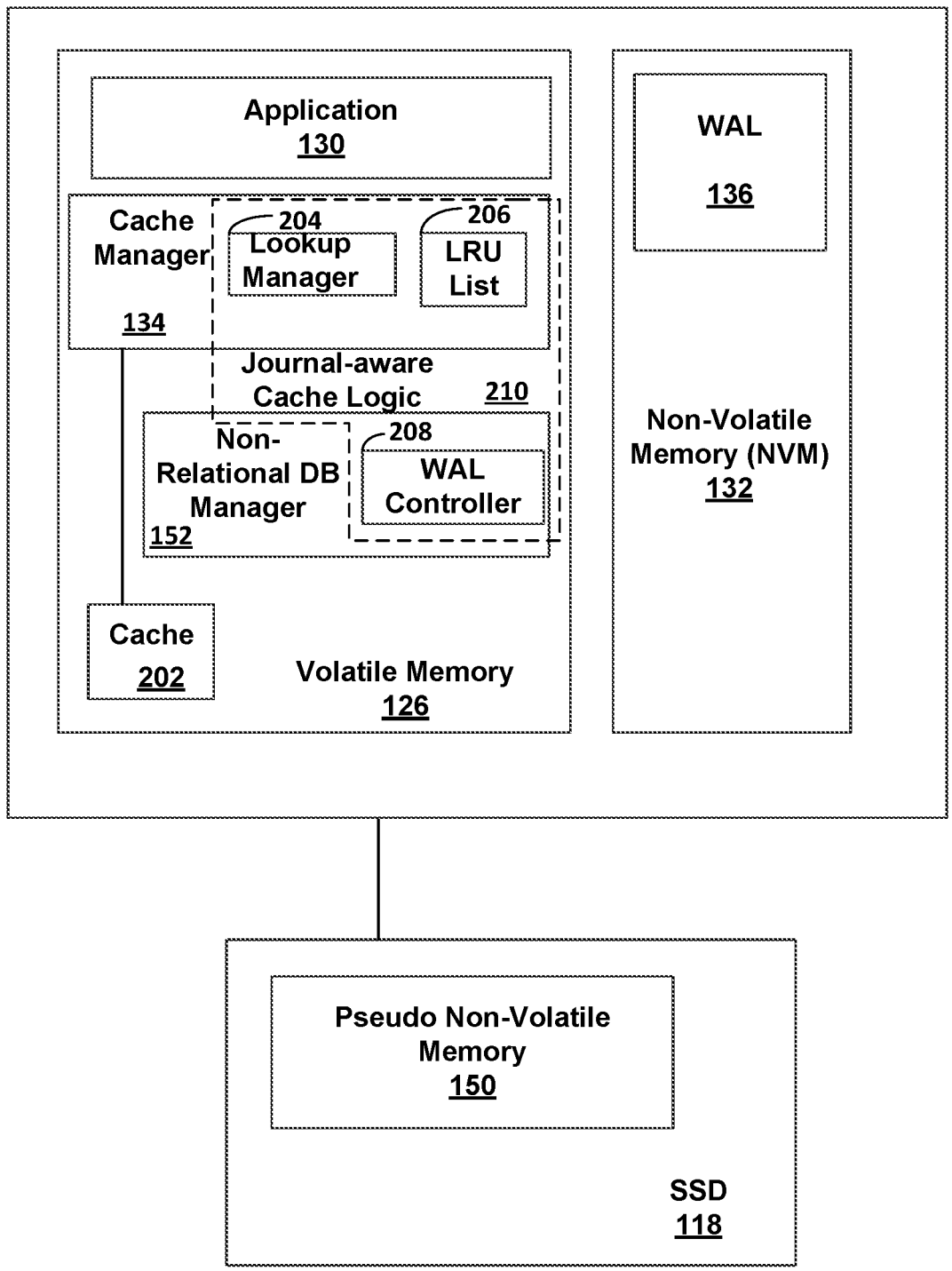
FIG. 2 is a block diagram illustrating journal-aware cache logic in the computer system shown in FIG. 1 to ensure that data is not duplicated in the write-ahead-log ("journal") and the volatile cache memory ("cache")

FIG. 2 is a block diagram illustrating journal-aware cache logic 210 in the computer system shown in FIG. 1 to ensure that data is not duplicated in the write-ahead-log ("journal") 136 and the volatile cache memory ("cache") 202. The journal-aware cache logic 210 includes lookup manager 204 and a Least Recently Used list 206 in the cache manager 134 and write-ahead-log controller 208 in the non-relational database manager 152.

The non-relational database manager 152 in conjunction with the cache manager 134 can process requests for the database stored in the solid state drive 118 received from an application 130 in the computer system 100. The application 130 can request retrieval of data stored in the solid state drive 118, for example via a Get command. The application can request data be stored in the solid state drive 118, for example via a Put command. The application 130 can request deletion of data stored in the solid state drive 118, for example, via a Delete command.

The journal-aware cache logic 210 processes Get/Put/Delete commands received from application 130 by maintaining lookup structures, and issuing read and write requests to the solid state drive 118, and, via a write-ahead-log controller 208, to the write-ahead-log 136. In the embodiment shown, the cache manager 134 is separate from the non-relational database manager 152. In another embodiment, the cache manager 134 can be included in the non-relational database manager 152. The cache manager 134 manages data stored in the solid state drive 118 that is also stored ("cached") in cache 202 and in response to a Get command received from the application 130 forwards requests to read data that is not stored in the cache 202 to the non-relational database manager 152.

An embodiment will be described for a non-relational database that uses a key-value pair to store data in a storage device, such as solid state drive 118. The cache manager 134 maintains a search structure in the lookup manager 204 that maps a key in a key-value pair to an entry in a Least Recently Used list 206. An embodiment of an entry in the Least Recently Used list 206 will be described later in conjunction with FIG. 4. Any search structure, for example, hash tables or b-trees, can be used in the lookup manager 204. Red-Black (RB)-trees provide the advantage of being able to store a large amount of data, with O(log N) lookup time, no collisions, and with amount of memory that scales with the amount of data being maintained by the tree.

The write-ahead-log 136 in the non-volatile memory 132 can be a circular-buffer. The head pointer and tail pointer for the circular buffer can be maintained by the write-ahead-log controller 208 in volatile memory 126.

The write-ahead-log controller 208 manages the write-ahead-log 136 such that data is read from the write-ahead-log 136 in first-in-first-out (FIFO) order and written to the solid state drive 118. Least Recently Used and Write-through (WT) caching policy can be used for determining when to insert/evict entries from the cache 202, and to write them to the backing media.

Figure 3:
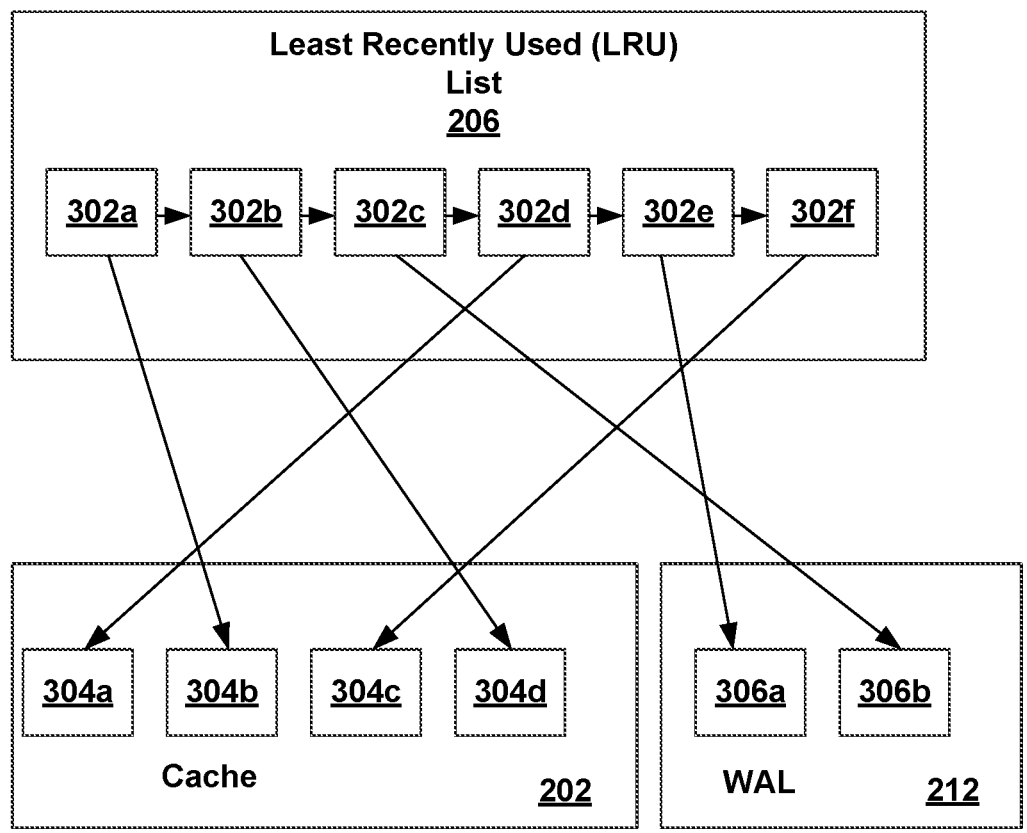
FIG. 3 illustrates the use of the Least Recently Used list to ensure that data is not duplicated in the write-ahead-log ("journal") and the volatile cache memory ("cache")

FIG. 3 illustrates the use of the Least Recently Used list 206 to ensure that data is not duplicated in the write-ahead-log ("journal") 136 and the volatile cache memory ("cache") 202. When data is inserted into the write-ahead-log 136, it is evicted from a cache entry in the cache 202. When data is evicted from a write-ahead log entry in the write-ahead-log 136, it is inserted into a cache entry in the cache 202. In other embodiments, cache queuing mechanisms other than the Least Recently Used list 206 may be used to ensure that data is not duplicated in the write-ahead-log ("journal") 136 and the volatile cache memory ("cache"). Referring to the example in FIG. 3, the Least Recently Used list 206 has six entries labelled 302a-302f. Link list entry 302a is the first entry ("head") of the list and entry 302f is the last entry ("tail") of the list. Each entry 302a-302f can also be referred to as a node. The cache has four cache entries labelled 304a-d. The write-ahead-log 136 has two write-ahead-log entries labelled 306a and 306b.

Each entry 302a-302f in the Least Recently Used list 206 has a pointer to one of the cache entries 304a-304d in the cache 304 or one of the write-ahead-log entries 306a-306b in the write-ahead-log 136.

Figure 4:
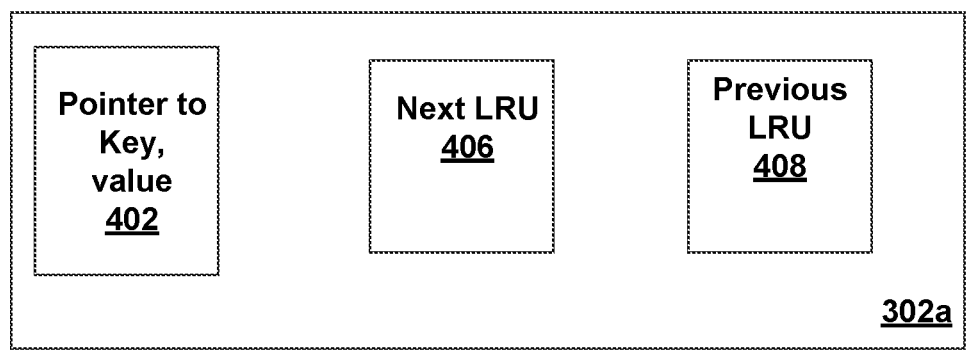
FIG. 4 illustrates any one of the least recently used linked list entries in FIG. 3.

FIG. 4 illustrates any one of the least recently used linked list entries 302a-302b in FIG. 3. As shown in FIG. 4, least recently used link list entry 302a includes a pointer to the key-value pair 402 stored in a cache entry in the cache 304 or a write-ahead-log entry in the write-ahead-log 136, a next Least Recently Used pointer 406 and a previous Least Recently Used pointer 408 that can be used to determine when the write-ahead-log entry in the write-ahead-log 136 or the cache entry in the cache 304 was last read or written.

Figure 5:
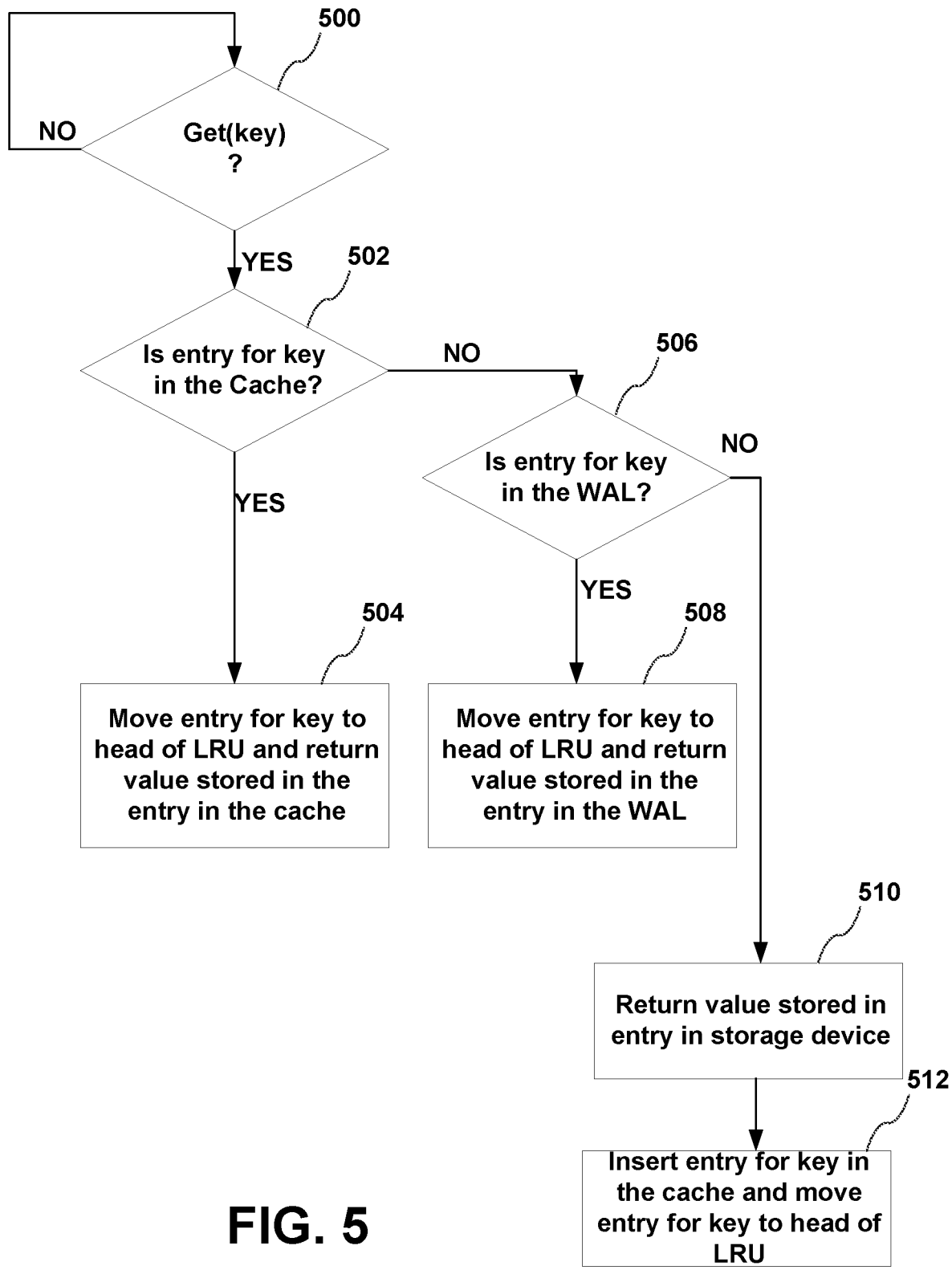
FIG. 5 is a flowgraph illustrating a method to process a request from an application to retrieve a key-value pair.

FIG. 5 is a flowgraph illustrating a method to process a request from an application 130 to retrieve a key-value pair.

At block 500, if a request to retrieve a key-value pair (for example, via a Get(key) command) is received from the application 130, processing continues with block 502.

At block 502, the lookup manager 204 determines if the requested key-value pair is stored in cache 202. If so, processing continues with block 504. If not, processing continues with block 506.

At block 504, the entry for the requested key-value pair is moved to the head of the Least Recently Used list 206 by storing a pointer to the key-value pair in cache 202. The value for the key-value pair is returned to the application 130.

At block 506, the write-ahead-log controller 208 determines if the requested key-value pair is stored in the write-ahead-log 136. If so, processing continues with block 508. If not, processing continues with block 510.

At block 508, the entry for the requested key-value pair is moved to the head of the Least Recently Used list 206 by storing a pointer to the key-value pair in the write-ahead-log 136. The value for the key-value pair is returned to the application 130.

At block 510, the requested key-value pair is retrieved from the solid state drive 118 and returned to the application 130. Processing continues with block 512.

At block 512, an entry for the retrieved key-value pair is inserted in the cache 202 and a pointer to the entry is inserted at the head of the Least Recently Used list 206.

Figure 6:
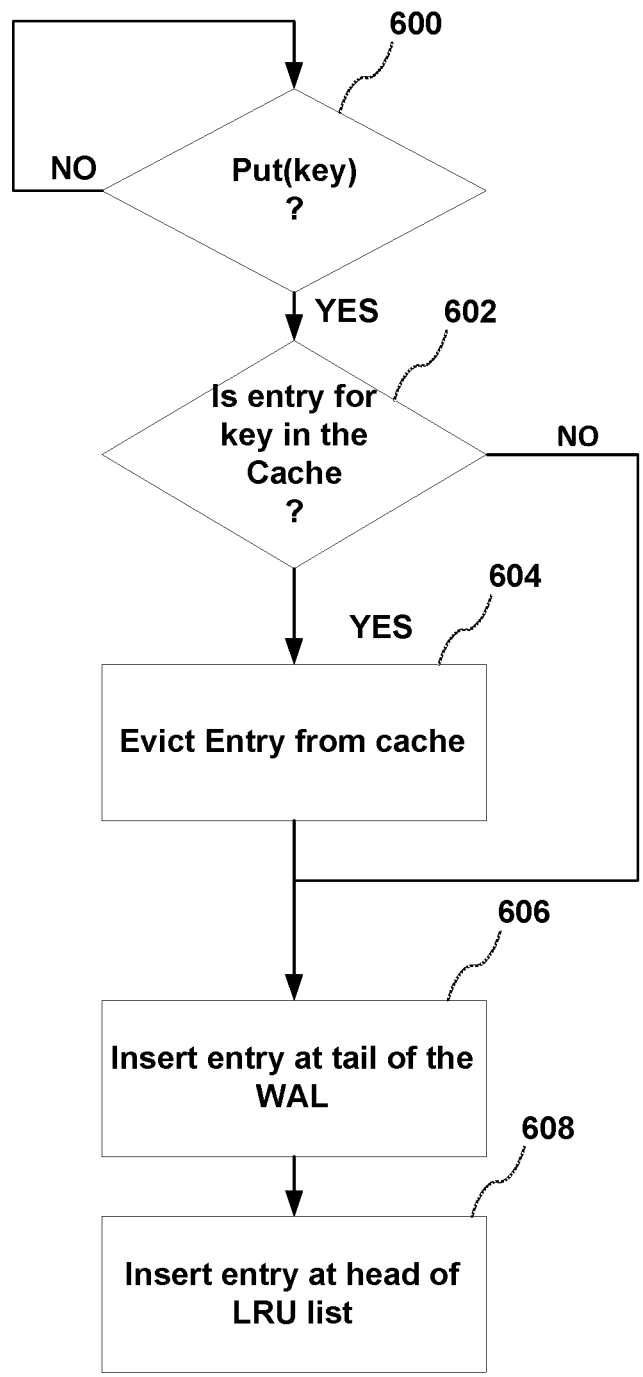
FIG. 6 is a flowgraph illustrating a method to process a request from an application to store a key-value pair.

FIG. 6 is a flowgraph illustrating a method to process a request from an application to store a key-value pair. The request may be to store an initial value for the key-value pair or to update a value for a key-value pair that is already stored in a databased in the storage device in the system. For example, if the key-value pair is a street address for a customer and the customer has moved to another street address, the request can be to update the street address.

At block 600, if a request to store a key-value pair (for example, via a Put(key) command) is received from the application 130, processing continues with block 602.

At block 602, if the key-value pair to be stored in the cache 202 is already stored in cache, for example, the store request is to update a value stored for the key, processing continues with block 604.

At block 604, the key-value pair stored in cache 202 is evicted from the cache because the value stored in cache is no longer valid based on the received request to update the value. Processing continues with block 606.

At block 606, the key-value pair to be updated in inserted at the tail of the write-ahead-log 136 to be written to the solid state drive 118. Processing continues with block 608.

At block 608, a pointer to the location in the write-ahead-log 136 in which the key-value pair to be written to the solid state drive 118 is stored is written to the head of the Least Recently Used list 206.

Figure 7:
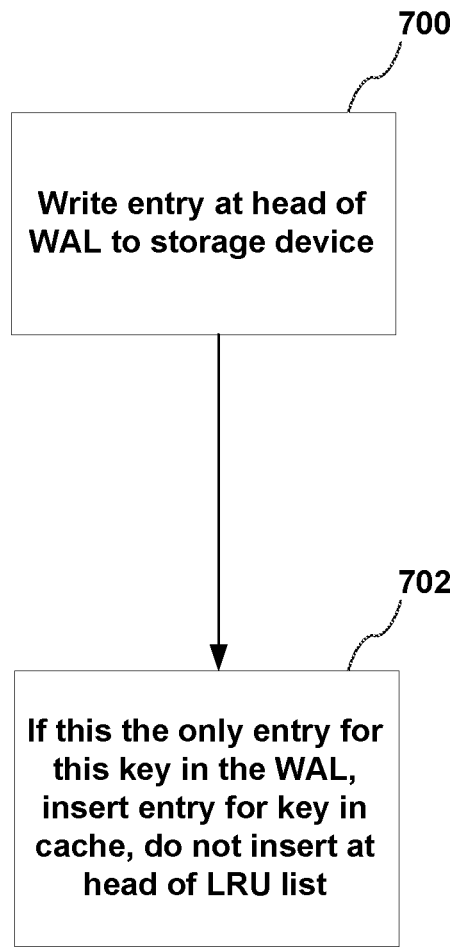
FIG. 7 is flowgraph illustrating a method to flush data stored in the write-ahead-log to the storage device.

FIG. 7 is a flowgraph illustrating a method to flush data stored in the write-ahead-log 136 to the solid state drive 118.

At block 700, the entry at the head of the write-ahead-log 136 is written to the solid state drive 118. Processing continues with block 702.

At block 702, if the entry written to the storage device is the most recent entry for the key-value pair, the entry written to the storage device is inserted in cache 202 but a pointer to the location in cache in which the entry is stored is not inserted at the head of the Least Recently Used list 206 because it is only in the write-ahead-log 212 and has not been updated since it was written to the write-ahead-log 212.

In another embodiment, as the entry in the write-ahead-log 212 has just recently been written by the application 130, it not expected to be read again in the near future and if it is read it is likely that is also stored in a page-cache in the operating system 142. Instead of inserting the entry in the cache 202, the entry is removed by updating the pointer to the write-ahead-log entry in the write-ahead-log 212.

In yet another embodiment, when the key-value pair is flushed from the write-ahead-log 136, the key-value pair is inserted in the cache as if it was updated and moved to the head of the Least Recently Used list 206.

An embodiment has been described for a journal-aware caching manager for a non-relational database that uses a data structure such as a key-value pair to store data. In another embodiment the journal-aware caching manager for journaled data can be used in a Redundant Array of Independent Disks (RAID) system or erasure coding (EC) system that uses journaling (via a write-ahead-log) to recover from a power failure while writing data and parity blocks to a disk in the RAID where parity is inconsistent with the data and cannot be used for recovery in the case of a disk failure (also referred to as a "write hole").

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. An apparatus comprising:
   a journal to store a key value pair to be written to a storage device;
   a cache to store the key value pair read from the storage device; and
   journal-aware cache logic to evict the key value pair from the cache when the key value pair is written to the journal and to insert the key value pair in the cache when the key value pair is evicted from the journal such that the key value pair is stored in one of the cache or the journal to ensure the key value pair is not duplicated in the journal and the cache, the journal-aware cache logic comprises a least recently used list, each entry in the least recently used list has a pointer to a cache entry in the cache or to a write-ahead-log entry in the journal.

2. The apparatus of claim 1, wherein the key value pair stored in the journal to be written to the storage device in first-in-first-out order.

3. The apparatus of claim 1, wherein the journal is a pseudo non-volatile memory in the storage device.

4. The apparatus of claim 1, wherein the journal is a non-volatile memory and the cache is a volatile memory.

5. The apparatus of claim 4, wherein the non-volatile memory is a byte addressable write-in-place memory.

6. A system comprising:
   a journal to store a key value pair to be written to a storage device;
   a cache to store the key value pair read from the storage device; and
   journal-aware cache logic to evict the key value pair from the cache when the key value pair is written to the journal and to insert the key value pair in the cache when the key value pair is evicted from the journal such that the key value pair is stored in one of the cache or the journal to ensure the key value pair is not duplicated in the journal and the cache, the journal-aware cache logic comprises a least recently used list, each entry in the least recently used list has a pointer to a cache entry in the cache or to a write-ahead-log entry in the journal; and
   a display communicatively coupled to a processor to display the key value pair stored in the cache.

7. The system of claim 6, wherein the key value pair stored in the journal to be written to the storage device in first-in-first-out order.

8. The system of claim 6, wherein the journal is a non-volatile memory and the cache is a volatile memory.

9. The system of claim 8, wherein the non-volatile memory is a byte addressable write-in-place memory.

10. A method comprising:
    storing a key value pair to be written to a storage device in a journal;
    storing the key value pair read from the storage device in a cache; and evicting, by journal-aware cache logic, the key value pair from the cache when the key value pair is written to the journal; and inserting, by the journal-aware cache logic, the key value pair in the cache when the key value pair is evicted from the journal such that the key value pair is stored in one of the cache or the journal to ensure the key value pair is not duplicated in the journal and the cache, the journal-aware cache logic comprises a least recently used list, each entry in the least recently used list has a pointer to a cache entry in the cache or to a write-ahead-log entry in the journal.

11. The method of claim 10, wherein data stored in the journal to be written to the storage device in first-in-first-out order.

12. The method of claim 10, wherein the journal is a pseudo non-volatile memory in the storage device.

13. The method of claim 10, wherein the journal is a non-volatile memory and the cache is a volatile memory.

14. The method of claim 13, wherein the non-volatile memory is a byte addressable write-in-place memory.

* * * * *